(12) United States Patent
Kim et al.

(10) Patent No.: US 7,660,213 B2
(45) Date of Patent: Feb. 9, 2010

(54) FOCUS LAYER JUMP CONTROL CIRCUITS AND METHODS OF CONTROLLING FOCUS LAYER JUMPS USED BY THE SAME

(75) Inventors: Je-kook Kim, Yongin-si (KR); Jun-ho Huh, Yongin-si (KR); Sang-hoon Moon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 506 days.

(21) Appl. No.: 11/655,190

(22) Filed: Jan. 19, 2007

(65) Prior Publication Data
US 2007/0171784 A1    Jul. 26, 2007

(30) Foreign Application Priority Data
Jan. 20, 2006    (KR) .................... 10-2006-0006287

(51) Int. Cl.
*G11B 7/00* (2006.01)
(52) U.S. Cl. .................... 369/44.35; 369/94
(58) Field of Classification Search .............. None
See application file for complete search history.

(56) References Cited

U.S. PATENT DOCUMENTS 6,298,020 B1 * 10/2001 Kumagami ............ 369/44.27

| 2001/0055254 | A1* | 12/2001 | Kishimoto et al. | ....... 369/53.14 |
| 2004/0141429 | A1* | 7/2004 | Kishimoto et al. | ....... 369/30.14 |
| 2005/0237889 | A1* | 10/2005 | Shioura et al. | ........... 369/53.28 |

FOREIGN PATENT DOCUMENTS

| JP | 04-060974 | 2/1992 |
| JP | 06-119644 | 4/1994 |
| JP | 08-063915 | 3/1996 |
| JP | 09-120549 | 5/1997 |

* cited by examiner

*Primary Examiner*—Paul Huber
(74) *Attorney, Agent, or Firm*—Harness, Dickey & Pierce, P.L.C.

(57) ABSTRACT

A focus layer jump control circuit may include a signal processing block that converts an analog focus error (FE) signal into a digital FE signal, in response to the analog FE signal and a FE selection signal; a layer jump control block that outputs a second control signal, in response to the digital FE signal and a reference clock signal; a focus main filter block that outputs first and second compensation signals that amplify the digital FE signal and that compensate for a phase of the digital FE signal, in response to an internal selection signal; an exponent signal generator that generates an exponent signal, in response to a focus layer jump indicating signal and a first control signal; and an output circuit that outputs a first-order difference signal using the exponent signal, the first compensation signal, and the second compensation signal, in response to the second control signal.

12 Claims, 6 Drawing Sheets

FOCUS LAYER JUMP CONTROL CIRCUITS AND METHODS OF CONTROLLING FOCUS LAYER JUMPS USED BY THE SAME

PRIORITY STATEMENT

This application claims priority from Korean Patent Application No. 10-2006-0006287, filed on Jan. 20, 2006, in the Korean Intellectual Property Office (KIPO), the entire contents of which are incorporated herein by reference.

BACKGROUND

1. Field

Example embodiments relate to optical discs. Also, example embodiments relate to focus layer jump control circuits of optical discs and methods of controlling focus layers jumps used by the focus layer jump control circuits.

2. Description of Related Art

To obtain data written in a pit of an optical disc, a laser beam is projected to the optical disc and light reflected from the projected laser beam is picked up. The picked up, reflected light is converted into a radio frequency (RF) signal using an optical element such as a photo diode. A tracking error (TE) signal, a focus error (FE) signal, and an information signal are extracted from the RF signal. The TE signal controls an actuator driver to follow a track of the optical disc. The FE signal controls a focus actuator driver that controls a focus actuator in an exact position so that a focus of the projected laser beam on the optical disc can be adjusted.

The optical disc arranges pits in a layer located at a specific depth from the surface thereof. A dual-layer optical disc arranges pits in at least two layers, each having a different depth from the surface thereof, and writes data in one of the at least two layers, thereby increasing an amount of writing in the optical disc. Unlike the optical disc that writes data in one layer, the dual-layer optical disc requires a layer-jump operation. That is, to reproduce data written in the two layers, the dual-layer optical disc must layer jump from one layer to the other layer.

FIG. 1 is a waveform for generating a kick/brake signal in performing a related art layer jump using a FE signal. Referring to FIG. 1, if a layer jump command is applied, a S-shaped curve of the FE signal is used to generate a kick signal and a brake signal for driving a focus actuator.

The kick signal and the brake signal are indicated as a signal in the bottom of FIG. 1. The kick signal with a voltage level VK provides physical force to the focus actuator to move the focus actuator. The brake signal with the voltage level VB suppresses the physical force applied to the focus actuator.

When a layer of an optical disc is tracked, if a layer jump command (L/J) is applied to enable the kick signal, a waveform of the FE signal changes according to the motion of the focus actuator in response to the kick signal.

The change of the FE signal is smaller from the center line when the FE signal performs tracking. If the layer jump command (L/J) is applied to enable the kick signal, the width of the change of the FE signal increases according to the motion of the focus actuator in response to the kick signal.

If a S-shaped waveform of the FE signal in the bottom of the center line is formed in layer 0, and a S-shaped waveform of the FE signal in the upper of the center line is formed in layer 1, the layer jump command (L/J) indicates a jump from the layer 0 to the layer 1.

A time period where a magnitude of the FE signal is greater than or equal to a magnitude of a first reference voltage V1 until the magnitude of the FE signal is smaller than a magnitude of a second reference voltage V2 is a first time period T1. When the magnitude of the FE signal is smaller than the magnitude of the second reference voltage V2, the kick signal is disabled. Thus, the kick signal is enabled during a second time period T2. The focus actuator moves using a force supplied according to the kick signal after the kick signal is disabled. A time period where the focus actuator moves is a time from when the kick signal is disabled until the magnitude of the FE signal is greater than a magnitude of a fourth reference voltage V4. The time period is a third time period T3.

The brake signal is enabled from an end of the third time period T3 until a fourth time period T4 having a length equal to one half of the first time period T1 (i.e., T4=T1/2). When the magnitude of the FE signal is smaller than a magnitude of a fifth reference voltage V5, after the fourth time period T4, the layer jump is completed and a light pickup is changed to a pull-in mode.

The third time period T3 must be narrowed. A reference value T_ref used to determine a voltage level VB of the brake signal is a time period twice as long as the third time period T3 (i.e., T_ref=2*T3).

The voltage level VB of the brake signal is determined based on a comparison value COMPARE obtained by equation (1).

$$\text{COMPARE} = T3 - T\_\text{ref} \qquad (1)$$

Wherein the comparison value COMPARE denotes a difference in time between the third time period T3 and the reference value T_ref.

A jump from the layer 1 to the layer 0 will now be described.

If the comparison value COMPARE is smaller than 0, the voltage level VB of the brake signal is set to a previously set maximum value. If a value obtained (by subtracting a value obtained by multiplying data stored in an address 0 with data stored in an address 20 from the comparison value COMPARE) is greater than 0, the voltage level VB of the brake signal is set to the previously set reference value. In addition, a value stored in data of an address COMPARE+0×E0 is set to the voltage level VB of the brake signal. 0×E0 denotes a value obtained by multiplying the data stored in the address 0 with data stored in an address E0.

When a jump is performed from the layer 0 to the layer 1, if the comparison value COMPARE is smaller than 0, the voltage level VB of the brake signal is set to a previously set minimum value. If a value obtained (by subtracting a value obtained by multiplying the data stored in the address 0 with the data stored in the address 20 from the comparison value COMPARE) is greater than 0, the voltage level VB of the brake signal is set to the previously set reference value. In addition, a value stored in data of the address COMPARE+ 0×E0 is set to the voltage level VB of the brake signal.

The kick signal and the brake signal used for the layer jump of a related art digital versatile disc (DVD) dual disc have pulse waveforms, and thus have the following disadvantages.

1. Since a focus kick signal has a pulse waveform, it is difficult to control the accelerating force of the actuator.

2. Since the brake signal has the pulse waveform, if brakes controlled by the brake signal are too strong, the focus actuator can be returned to an original layer. If brakes controlling the brake signal are too weak, the focus actuator can be returned to a new layer but a focus pull-in can be impossible.

3. If a layer is off track after the layer jump, no focus-range signal is input and no control is performed. Therefore, since the focus pull-in must be performed again, a screen temporarily stops reproduction of the dual-layer optical disc.

SUMMARY

Example embodiments provide a focus layer jump control circuit that prevents a screen from temporarily stopping reproduction by generating a minimum inertial force and a minimum brake signal in a focus actuator.

The present invention also provides a method of controlling a focus layer jump employed by a focus layer jump control circuit.

According to an aspect of the present invention, there is provided a focus layer jump control circuit comprising: a signal processing block converting an analog focus error (FE) signal into a digital FE signal in response to the analog FE signal and a FE selection signal; a layer jump control block outputs a layer second control signal in response to the digital FE signal and a reference clock signal; a focus main filter block outputting first and second compensation signals amplifying the digital FE signal and compensating for the phase of the digital FE signal in response to an internal selection signal; an exponent signal generator generating an exponentially increasing/decreasing exponent signal using a step signal in response to a focus layer jump indicating signal and a first control signal; and an output circuit outputting a first-order difference (FOD) signal using the exponent signal EXP, the first compensation signal, and the second compensation signal in response to the second control signal.

According to another aspect of the present invention, there is provided a method of controlling a focus layer jump from a present layer to another layer in response to a focus layer jump signal, the method comprises: generating a step signal in response to the focus layer jump signal; generating a kick signal using the step signal and exponentially decreasing or increasing a voltage level of the kick signal using a first S-shaped curve of a FE signal; generating a brake signal using a second S-shaped curve of the FE signal; and determining whether a focus actuator satisfies focus on conditions and indicating the focus actuator to enter a focus on mode.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
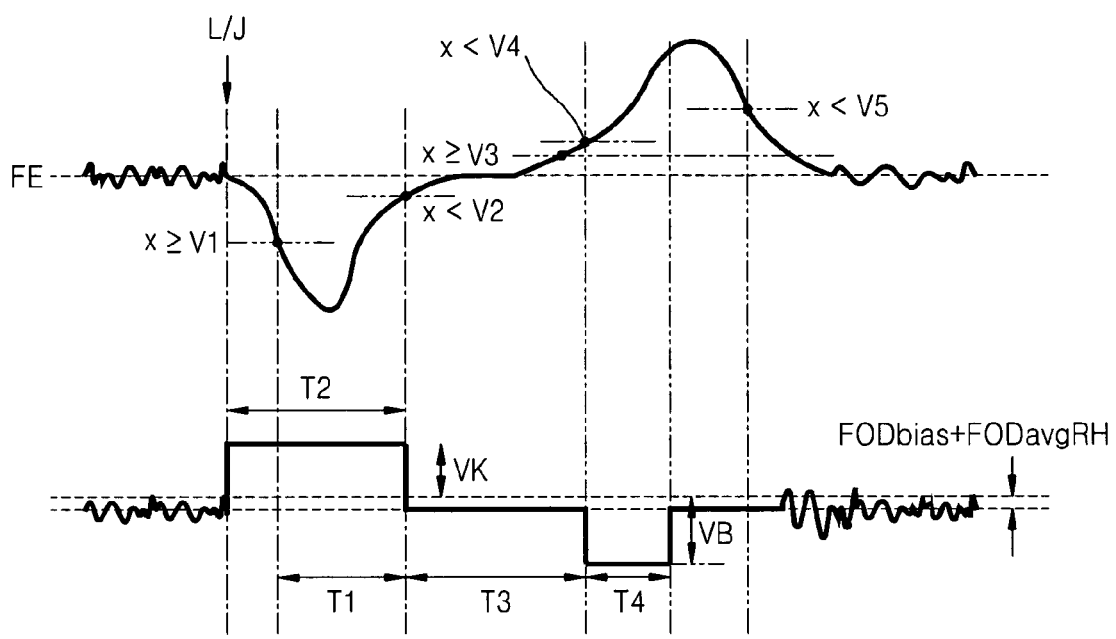
FIG. 1 is a waveform for generating a kick/brake signal in performing a related art layer jump using a FE signal.

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art. In the drawings, thicknesses of layers and regions may be exaggerated for clarity.

It will be understood that when an element is referred to as being "on," "connected to," or "coupled to" to another component, it may be directly on, connected to, or coupled to the other component or intervening components may be present. In contrast, when a component is referred to as being "directly on," "directly connected to," or "directly coupled to" another component, there are no intervening components present. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element component, region, layer, and/or section from another element, component, region, layer, and/or section. For example, a first element, component, region, layer, and/or section could be termed a second element, component, region, layer, and/or section without departing from the teachings of the example embodiments.

Spatially relative terms, such as "beneath," "below," "lower," "above," "upper," and the like may be used herein for ease of description to describe one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 2:
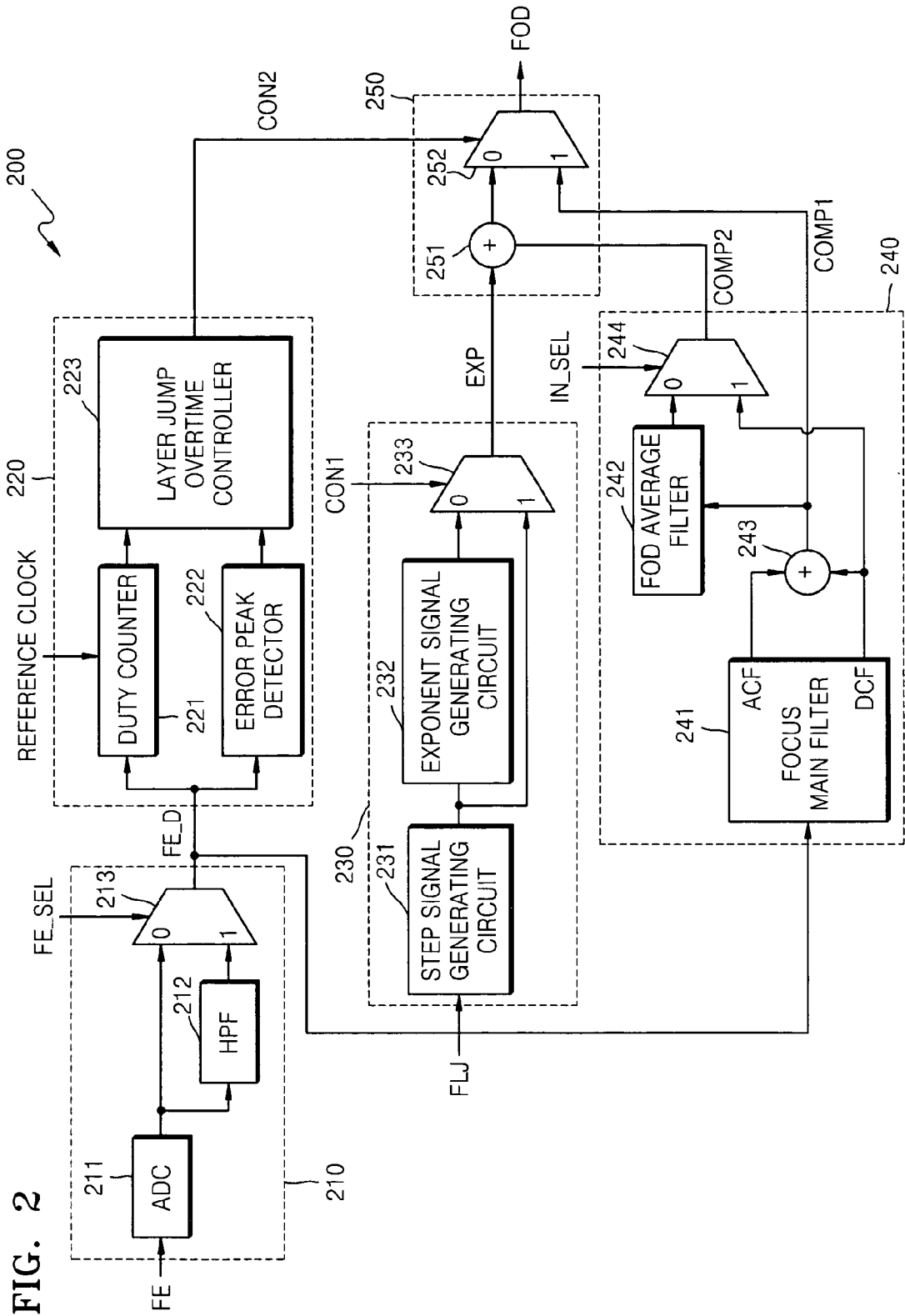
FIG. 2 is a block diagram of a focus layer jump control circuit according to an example embodiment.

FIG. 2 is a block diagram of a focus layer jump control circuit 200 according to an example embodiment. Referring to FIG. 2, the focus layer jump control circuit 200 may include a signal processing block 210, a layer jump control block 220, an exponent signal generator 230, a focus main filter block 240, and/or an output circuit 250.

The signal processing block 210 may include an analog-to-digital converter (ADC) 211, a high-pass filter (HPF) 212, and/or a first multiplexer 213. The signal processing block 210 may convert an analog FE signal into a digital FE signal FE_D in response to the analog FE signal and/or a FE selection signal FE_SEL. The ADC 211 may convert the analog FE signal into the digital FE signal FE_D. The HPF 212 may remove a direct current (DC) offset included in a signal output by the ADC 211. In response to the FE selection signal FE_SEL, the first multiplexer 213 may select the signal output by the ADC 211 or a signal output by the HPF 212. The first multiplexer 213 may output the digital FE signal FE_D.

The layer jump control block 220 may include a duty counter 221, an error peak detector 222, and/or a layer jump overtime controller 223. The layer jump control block 220 may output a second control signal CON2 in response to the digital FE signal FE_D and/or a reference clock signal REFERENCE CLOCK. The duty counter 221 may detect an accelerating speed of the focus actuator using the digital FE signal FE_D and/or the reference clock signal. The error peak detector 222 may detect a peak value of the digital FE signal FE_D. The layer jump overtime controller 223 may measure a layer jump time using signals output by the duty counter 221 and/or the error peak detector 222. The layer jump overtime controller 223 may output the second control signal CON2. The error peak detector 222 may include at least three shift registers.

The exponent signal generator 230 may include a step signal generating circuit 231, an exponent signal generating circuit 232, and/or a second multiplexer 233. The exponent signal generator 230 may generate an exponentially increasing/decreasing exponent signal EXP using a step signal in response to a focus layer jump indicating signal FLJ and/or a first control signal CON1. The step signal generating circuit 231 may be enabled when the focus layer jump indicating signal FLJ is applied and may be disabled when a second S-shaped curve of the analog FE signal starts. The exponent signal generating circuit 232 may output the exponent signal EXP that exponentially decreases from a high state to a low state when a step signal output by the step signal generating circuit 231 transitions from a logic low state to a logic high state, and that exponentially increases from the low state to the high state when the step signal output by the step signal generating circuit 231 transitions from the logic high state to the logic low state. The exponent signal generating circuit 232 may include at least one of a high-pass filter, a low-pass filter, and a sinusoidal synthesizer. In response to the first control signal CON1, the second multiplexer 233 may select a signal output by the step signal generating circuit 231 or a signal output by the exponent signal generating circuit 232. The first control signal CON1 may control a kick signal to maintain a specific enabled voltage level and/or be exponentially increased or decreased.

The focus main filter block 240 may include a focus main filter 241, a FOD average filter 242, a first adder 243, and/or a third multiplexer 244. The focus main filter block 240 may output a first compensation signal COMP1 and a second compensation signal COMP2. The first compensation signal COMP1 and second compensation signal COMP2 may amplify the digital FE signal FE_D and/or may compensate for the phase of the digital FE signal FE_D in response to an internal selection signal IN_SEL. The focus main filter 241 may output a first signal ACF and a second signal DCF that may amplify the digital FE signal FE_D and may compensate for the phase of the digital FE signal FE_D. The focus main filter 241 may include an alternating current (AC) filter (not shown) and/or a DC filter (not shown). The AC filter may amplify the digital FE signal FE_D, may compensate for the phase of the digital FE signal FE_D, and may output the first signal ACF. The DC filter may amplify the digital FE signal FE_D, may compensate for the phase of the digital FE signal FE_D, and may output the second signal DCF. The FOD average filter 242 may output an average value of signals output by the first adder 243. The FOD average filter 242 may be a DC low-pass filter. The first adder 243 logically adds the first signal ACF and the second signal DCF. In response to the internal selection signal IN_SEL, the third multiplexer 244 may select a signal output by the FOD average filter 242 or the second signal DCF. The third multiplexer 244 may output the selected signal.

The output circuit 250 may include a second adder 251 and/or a fourth multiplexer 252. In response to the second control signal CON2, the output circuit 250 may output a FOD signal using the exponent signal EXP, the first compensation signal COMP1, and/or the second compensation signal COMP2. The second adder 251 may logically add the exponent signal EXP and the second compensation signal COMP2. In response to the second control signal CON2, the fourth multiplexer 252 may select a signal output by the second adder 251 or the first compensation signal COMP1. The fourth multiplexer 252 may output the FOD signal. The FOD signal may be used to generate the kick signal and the brake signal for controlling the focus actuator.

Figure 3:
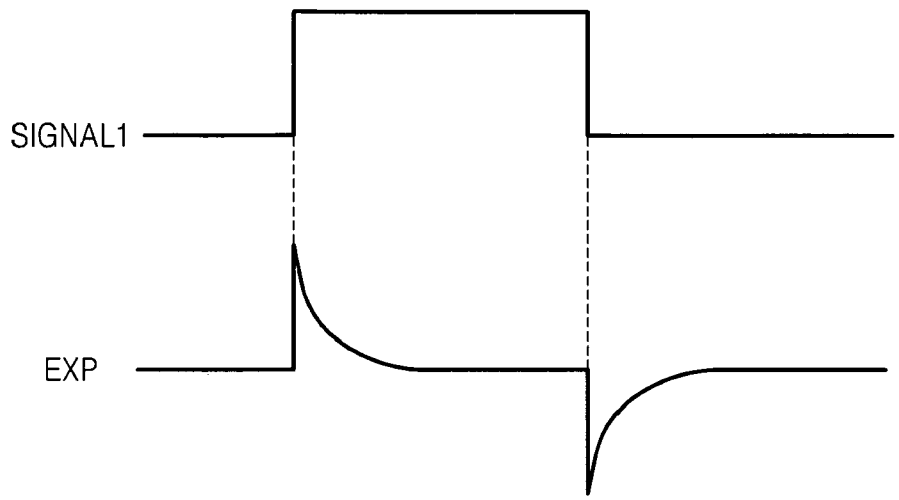
FIG. 3 is a waveform of an internal signal of an exponent signal generator of FIG. 2.

FIG. 3 is a waveform of an internal signal of the exponent signal generator 230. Referring to FIG. 3, the step signal output by the step signal generating circuit 231 may be enabled when the focus layer jump indicating signal FLJ is applied and may be disabled when the second S-shaped curve of the analog FE signal starts. The exponent signal output by the exponent signal generating circuit 232 may be a signal obtained by differentiating the step signal output by the step signal generating circuit 231. When the step signal SIGNAL1 transitions from a logic low state to a logic high state, the exponential signal EXP may undergo a step increase, followed by exponential decrease. When the step signal SIGNAL1 transitions from the logic high state to the logic low state, the exponential signal EXP may undergo a step decrease, followed by exponential increase.

Since the exponent signal EXP may include the offset of the digital FE signal FE_D, the second adder 251 may add signals output by the second multiplexer 233 and the third multiplexer 244. In response to the internal selection signal IN_SEL, the third multiplexer 244 may select the second signal DCF or the signal output by the FOD average filter 242. The second control signal CON2 may control the fourth multiplexer 252 to select the signal output by the second adder 251 or the first compensation signal COMP1. The second control signal CON2 may control the fourth multiplexer 252 to output the FOD signal. The FOD signal may be transferred to the focus actuator, thereby starting a layer jump.

Figure 4:
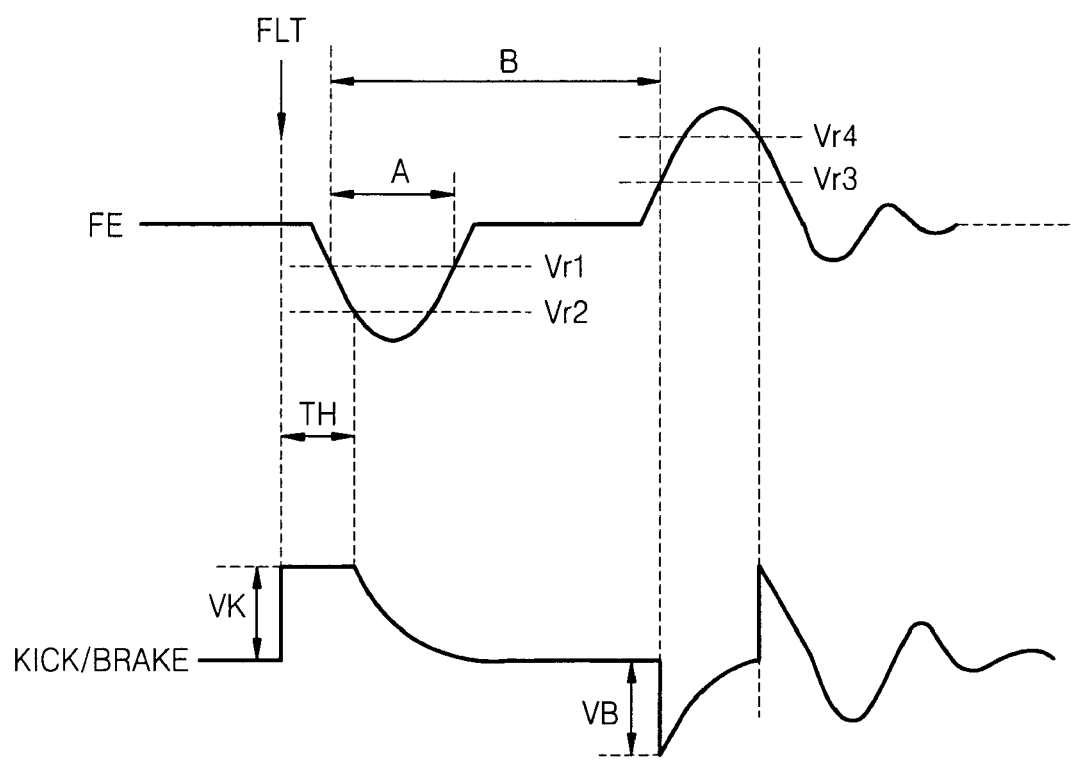
FIG. 4 is a waveform for explaining the focus layer jump control circuit of FIG. 2.

FIG. 4 is a waveform for explaining the focus layer jump control circuit 200. Referring to FIG. 4, a kick/brake signal KICK/BRAKE corresponding to the analog FE signal may be generated.

The operation of the focus layer jump control circuit 200 will now be described with reference to FIGS. 3 and 4.

When the focus layer jump indicating signal FLJ is enabled, since the second multiplexer 233 selects the step signal output by the step signal generating circuit 231, the exponent signal EXP may have a DC voltage, and may become the FOD signal through the second adder 251 and/or the fourth multiplexer 252.

When the focus actuator attempts a layer jump operation in response to the kick signal generated by using the FOD signal, the analog FE signal may generate an S-shaped curve of a layer 0.

A focus layer kick signal may be enabled at a uniform voltage level VK until a voltage level of the first S-shaped curve of the analog FE signal satisfies a predetermined second reference voltage Vr2. The second reference voltage Vr2 may be between a ground voltage and a peak voltage of the analog FE signal.

If the voltage level of the first S-shaped curve of the analog FE signal satisfies the second reference voltage Vr2, the second multiplexer 233 may select a signal output by the exponent signal generating circuit 232. Therefore, the exponent signal EXP output by the second multiplexer 233 may undergo exponential decrease. When the focus actuator jumps from a present layer to another layer, the analog FE signal may generate a second S-shaped curve.

If a voltage level of the second S-shaped curve of the analog FE signal satisfies a third reference voltage Vr3, the brake signal may be generated. A time period from when the voltage level of the first S-shaped curve of the analog FE signal satisfies a first reference voltage Vr1 until the voltage level of the second S-shaped curve of the analog FE signal satisfies to the third reference voltage Vr3 may be a brake time coefficient B.

The brake time coefficient B may be reflected in a voltage level of the brake signal in order to minimize the force accelerating the focus actuator. When the brake signal is applied, a large value of the brake time coefficient B may indicate a small inertia of the focus actuator. In this situation, the voltage level of the brake signal may be reduced. Conversely, when the brake signal is applied, a small value of the brake time coefficient B may indicate a large inertia of the focus actuator. In that situation, the voltage level of the brake signal may be increased.

If following conditions are satisfied after the second S-shaped curve is generated, the analog FE signal may be focused on when 1. a duty over time A—extracted from the first S-shaped curve of the analog FE signal—passes;

2. at least one of three points of the second S-shaped curve of the analog FE signal represents a voltage value past a peak value of the second S-shaped curve by comparing voltage levels of the three points; and 3. a specific time passes after a command indicating the focus layer jump is applied.

The duty over time A may indicate a time period where a magnitude of a value of the first S-shaped curve is greater than a magnitude of the first reference voltage Vr1.

The three points of the second S-shaped curve may be stored in the three of the shift registers of the error peak detector 222 to determine if one of the three points passes through the peak value of the second S-shaped curve.

To establish a brake time of the focus actuator, time from when the layer jump operation starts until the voltage level of the analog FE signal passes through a predetermined voltage level may be measured and stored. The analog FE signal may pass through the HPF 212 to remove noise.

Figure 5:
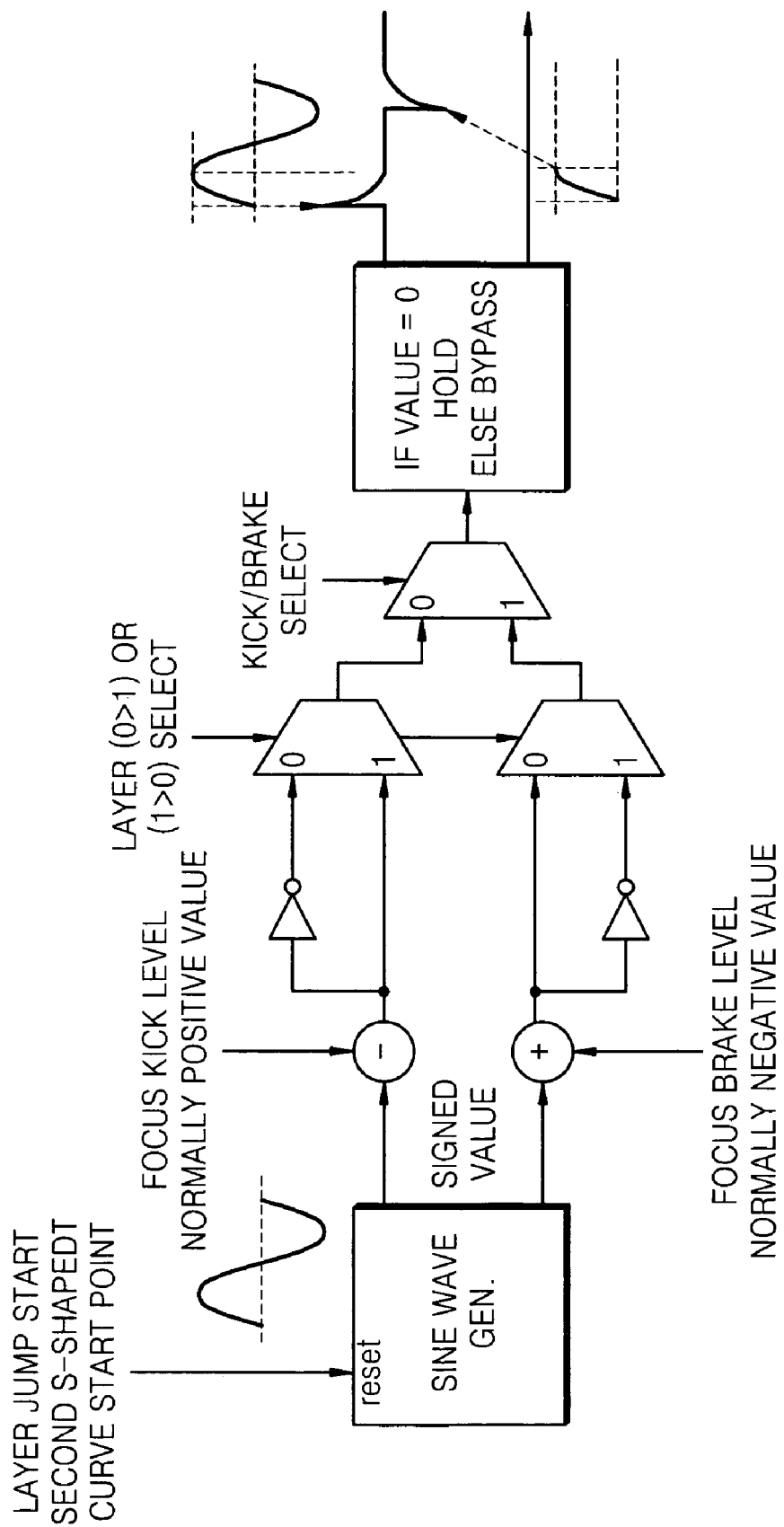
FIG. 5 is a circuit diagram of the exponent signal generating circuit of FIG. 2 according to an example embodiment.
Figure 6:
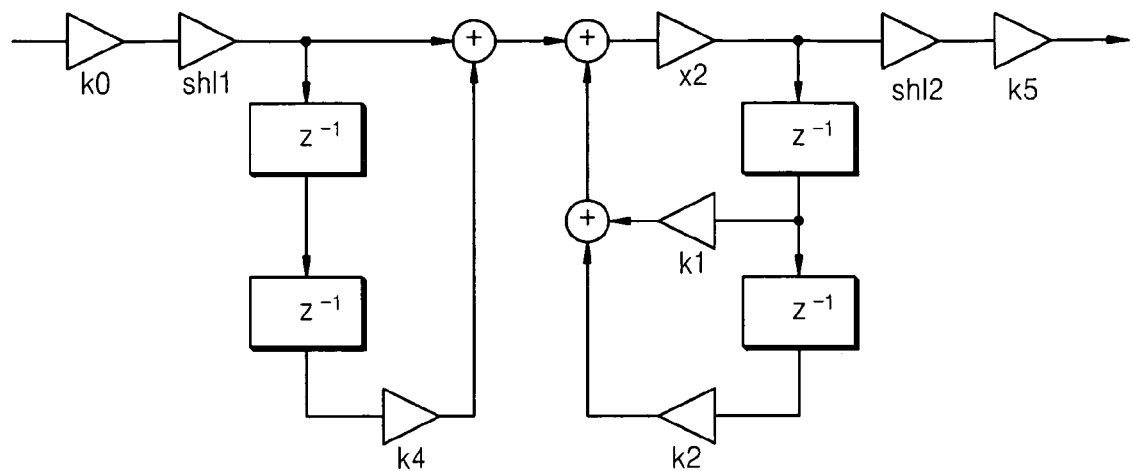
FIG. 6 is a circuit diagram of the exponent signal generating circuit of FIG. 2 according to another example embodiment.
Figure 7:
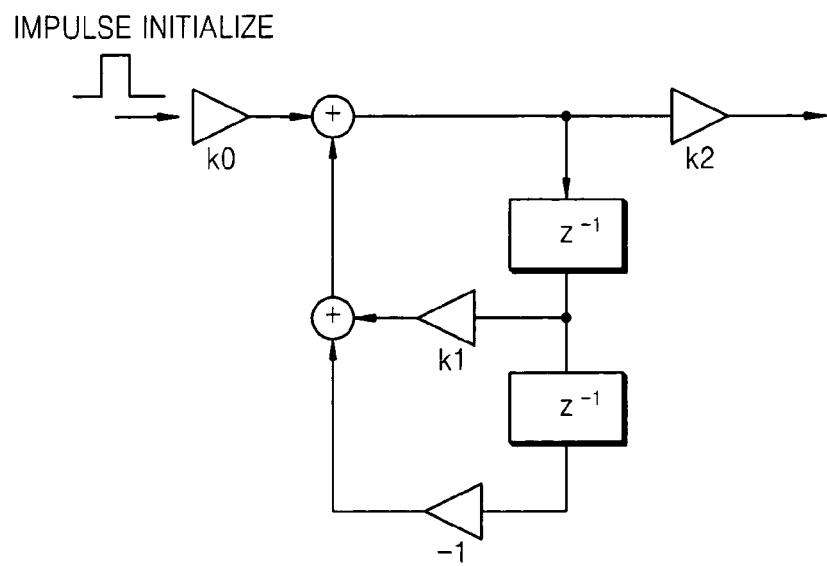
FIG. 7 is a circuit diagram of the exponent signal generating circuit of FIG. 2 according to yet another example embodiment.

FIG. 5 is a circuit diagram of the exponent signal generating circuit 232 according to an example embodiment. FIG. 6 is a circuit diagram of the exponent signal generating circuit 232 according to another example embodiment. FIG. 7 is a circuit diagram of the exponent signal generating circuit 232 according to yet another example embodiment.

Referring to FIGS. 5, 6, and 7, the exponent signal generating circuit 232 may be realized, for example, as a sine-wave generator, a band-pass filter, and/or a sine-wave synthesizer.

Figure 8:
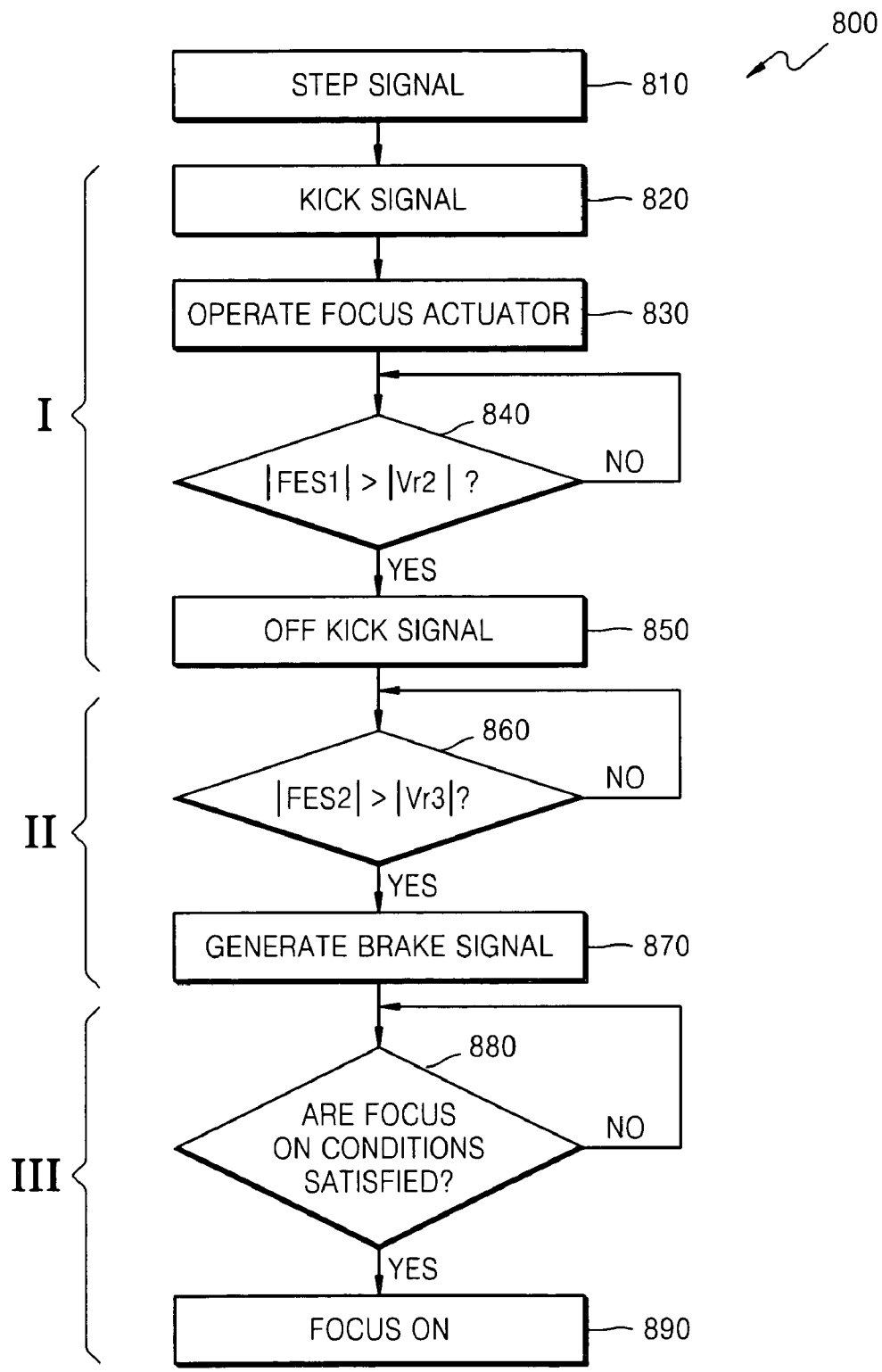
FIG. 8 is a flowchart of a method of controlling a focus layer jump according to an example embodiment.

FIG. 8 is a flowchart of a method of controlling a focus layer jump according to an example embodiment. Referring to FIG. 8, the method of controlling the focus layer jump may include four operations: generating a step signal in response to a focus layer jump signal (Operation 810); generating a kick signal using the step signal and exponentially decreasing or increasing a voltage level of the kick signal using a first S-shaped curve of a FE signal (Operation I); generating a brake signal using a second S-shaped curve of the FE signal (Operation II); and/or determining whether a focus actuator satisfies focus on conditions and indicating the focus actuator to enter a focus on mode (Operation III).

Operation I may include: generating the kick signal using the step signal (Operation 820); operating the focus actuator using the kick signal (Operation 830); comparing a voltage level of a first S-shaped curve of the FE signal generated from the operation of the focus actuator with a second reference voltage Vr2 until a magnitude of the voltage level of the first S-shaped curve is greater than a magnitude of the second reference voltage Vr2 (Operation 840); and/or generating an off kick signal when the magnitude of the voltage level of the first S-shaped curve is greater than the magnitude of the second reference voltage Vr2 (Operation 850). The off kick signal may be exponentially decreased or increased from a voltage level of the kick signal.

Operation II may include: comparing a voltage level of a second S-shaped curve of the FE signal with a third reference voltage Vr3 until a magnitude of the voltage level of the second S-shaped curve is greater than a magnitude of the third reference voltage Vr3 (Operation 860); and/or generating a brake signal when the magnitude of the voltage level of the second S-shaped curve is greater than the magnitude of the third reference voltage Vr3 (Operation 870). The magnitude of the brake signal may be determined based on the time required to operate the focus actuator after generating the off kick signal.

Operation III may include: determining if the state of the focus actuator satisfies the focus on conditions (Operation 880); and/or, if the state of the focus actuator satisfies the focus on conditions, entering the focus on mode (Operation 890).

The focus on conditions may be when 1. a duty over time A—extracted from the first S-shaped curve of the analog FE signal—passes;

2. at least one of three points of the second S-shaped curve of the analog FE signal represents a voltage value past a peak value of the second S-shaped curve by comparing voltage levels of the three points; and 3. a specific time passes after a command indicating the focus layer jump is applied.

The duty over time A may indicate a time period where the magnitude of the value of the first S-shaped curve is greater than the magnitude of the first reference voltage Vr1. A magnitude of the first reference voltage Vr1 may be smaller than a magnitude of the second reference voltage Vr2.

The three points of the second S-shaped curve may be stored in the three of the shift registers of the error peak detector 222.

The focus layer jump control circuit and the method of controlling the focus layer jump may generate a minimum inertia and brake signal in the focus actuator, thereby preventing a screen from temporarily stopping the reproduction of an optical disc, and increasing reliability of a DVD dual disc and a filed disc with a low reflexibility.

While example embodiments have been particularly shown and described, it will be understood by those of ordinary skill in the art that various changes in form and details may be made therein without departing from the spirit and scope of the present invention as defined by the following claims.

What is claimed is:

1. A focus layer jump control circuit, comprising:
   a signal processing block that converts an analog focus error (FE) signal into a digital FE signal, in response to the analog FE signal and a FE selection signal;
   a layer jump control block that outputs a second control signal, in response to the digital FE signal and a reference clock signal;
   a focus main filter block that outputs first and second compensation signals that amplify the digital FE signal and that compensate for a phase of the digital FE signal, in response to an internal selection signal;
   an exponent signal generator that generates an exponent signal, in response to a focus layer jump indicating signal and a first control signal; and
   an output circuit that outputs a first-order difference signal using the exponent signal, the first compensation signal, and the second compensation signal, in response to the second control signal.

2. The circuit of claim 1, wherein the signal processing block comprises:
   an analog-to-digital converter that converts the analog FE signal into a digital signal output;
   a high-pass filter that can remove a direct-current offset from the digital signal output by the analog-to-digital converter; and
   a first multiplexer that selects the digital signal output by the analog-to-digital converter or a signal output by the high-pass filter, in response to the FE selection signal, and that outputs the digital FE signal.

3. The circuit of claim 1, wherein the layer jump control block comprises:
   a duty counter that detects an accelerating speed of a focus actuator using the digital FE signal and the reference clock signal;
   an error peak detector that detects a peak value of the digital FE signal; and
   a layer jump overtime controller that measures a layer jump time using signals output by the duty counter and the error peak detector, and that outputs the second control signal.

4. The circuit of claim 3, wherein the error peak detector comprises at least three shift registers.

5. The circuit of claim 1, wherein the focus main filter block comprises:
   a focus main filter that outputs first and second signals that amplify the digital FE signal and that compensate for the phase of the digital FE signal;
   a first adder that logically adds the first and second signals;
   a first-order difference average filter that outputs an average value of signals output by the first adder; and
   a second multiplexer that selects a signal output by the first-order difference average filter or the second signal, in response to the internal selection signal, and that outputs the selected signal.

6. The circuit of claim 5, wherein the focus main filter comprises:
   an alternating-current filter that amplifies the digital FE signal, that compensates for the phase of the digital FE signal, and that outputs the first signal; and
   a direct-current filter that amplifies the digital FE signal, that compensates for the phase of the digital FE signal, and that outputs the second signal.

7. The circuit of claim 5, wherein the first-order difference average filter comprises a direct-current low-pass filter.

8. The circuit of claim 1, wherein the exponent signal generator comprises:
   a step signal generating circuit that is enabled when the focus layer jump indicating signal is applied, and that is disabled when a second S-shaped curve of the analog FE signal starts;
   an exponent signal generating circuit that outputs the exponent signal that exponentially decreases from a high state to a low state when a step signal output by the step signal generating circuit transitions from a logic low state to a logic high state, and exponentially increases from the low state to the high state when the step signal output by the step signal generating circuit transitions from the logic high state to the logic low state; and
   a second multiplexer that selects a signal output by the step signal generating circuit or the exponent signal generating circuit, in response to the first control signal.

9. The circuit of claim 8, wherein the exponent signal generating circuit comprises at least one of a high-pass filter, a low-pass filter, and a sinusoidal synthesizer.

10. The circuit of claim 8, wherein the first control signal controls a kick signal that maintains a specific enabled voltage level and then exponentially increases or decreases the specific enabled voltage level.

11. The circuit of claim 1, wherein the output circuit comprises:
    a second adder that logically adds the exponent signal and the second compensation signal; and
    a fourth multiplexer that selects a signal output by the second adder or the first compensation signal, in response to the second control signal, and that outputs the first-order difference signal.

12. The circuit of claim 1, wherein the first-order difference signal is used to control a focus actuator.

* * * * *